(12) United States Patent
Hull (10) Patent No.: US 7,633,202 B2
(45) Date of Patent: Dec. 15, 2009

(54) DAMPING IN HIGH-TEMPERATURE SUPERCONDUCTING LEVITATION SYSTEMS

(75) Inventor: John R. Hull, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 11/745,376

(22) Filed: May 7, 2007

(65) Prior Publication Data

US 2008/0278270 A1    Nov. 13, 2008

(51) Int. Cl.
*F16C 32/04* (2006.01)
*H01F 6/00* (2006.01)
(52) U.S. Cl. ................ 310/90.5; 335/216; 505/166
(58) Field of Classification Search ............ 361/141, 361/144; 335/216; 505/163, 166; 310/90.5
See application file for complete search history.

(56) References Cited

FOREIGN PATENT DOCUMENTS

JP             06081843 A  *  3/1994

* cited by examiner

*Primary Examiner*—Ramon M Barrera
(74) *Attorney, Agent, or Firm*—Canady & Lortz LLP; Bradley K. Lortz (57) ABSTRACT

Methods and apparatuses for improved damping in high-temperature superconducting levitation systems are disclosed. A superconducting element (e.g., a stator) generating a magnetic field and a magnet (e.g. a rotor) supported by the magnetic field are provided such that the superconducting element is supported relative to a ground state with damped motion substantially perpendicular to the support of the magnetic field on the magnet. Applying this, a cryostat housing the superconducting bearing may be coupled to the ground state with high damping but low radial stiffness, such that its resonant frequency is less than that of the superconducting bearing. The damping of the cryostat may be substantially transferred to the levitated magnetic rotor, thus, providing damping without affecting the rotational loss, as can be derived applying coupled harmonic oscillator theory in rotor dynamics. Thus, damping can be provided to a levitated object, without substantially affecting the rotational loss.

22 Claims, 9 Drawing Sheets

DAMPING IN HIGH-TEMPERATURE SUPERCONDUCTING LEVITATION SYSTEMS

STATEMENT OF GOVERNMENT RIGHTS

This invention was made with Government support under contract No. DE-FC3699-GO10285 awarded by the Department of Energy. The Government has certain rights in this invention.

BACKGROUND OF THE INVENTION

1. Field of the Invention

This invention relates to damping in superconducting levitation systems. Particularly, this invention relates to damping in high-temperature superconducting bearings in levitation systems, such as used to support a flywheel energy storage system.

2. Description of the Related Art

Superconducting levitation systems, and specifically those employing superconducting bearings, are typically implemented with a superconducting stator (non levitated component) and a permanent magnet rotor (or levitated component). The superconductor is most commonly a bulk, high-temperature superconductor. Superconducting bearings of this type are useful because they can be used to form a passively stable levitation system with extremely low rotational losses. Such bearings have particular application to high-efficiency flywheel energy-storage devices. Superconducting bearings and high-efficiency flywheels have been subjects of past developments.

Figure 1A:
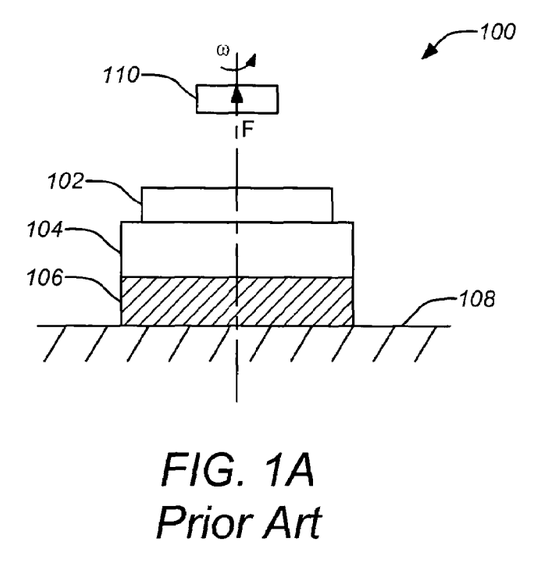
FIGS. 1A & 1B illustrate conventional permanent magnet high-temperature superconducting levitation systems.

FIG. 1A illustrates a conventional permanent magnet high-temperature superconducting levitation system 100. The superconductor element 102 (such as a stator) is coupled to a cold source 104 which maintains its temperature at a level to support superconductivity. A thermal insulator 106 isolates and supports the superconductor element 102 and the cold source 104 relative to a ground state 108. A magnetic field generated by the superconductor element 102 supports the permanent magnet 110 (e.g., a rotor spining at rate ω) levitating it above the superconductor element 102 with force F. In this example system 100, the permanent magnet 110 may be coupled to a larger structure and may comprise a more complex magnetic structure. The high-temperature superconductor element 102 may comprise one or more bulk crystals of yttrium barium copper oxide (YBCO) or any other known high-temperature superconductor material. Due to flux pinning in the high-temperature superconductor, the orientation of the central axis may be in any direction. For example, the permanent magnet could rotate below the high-temperature superconductor.

Figure 1B:
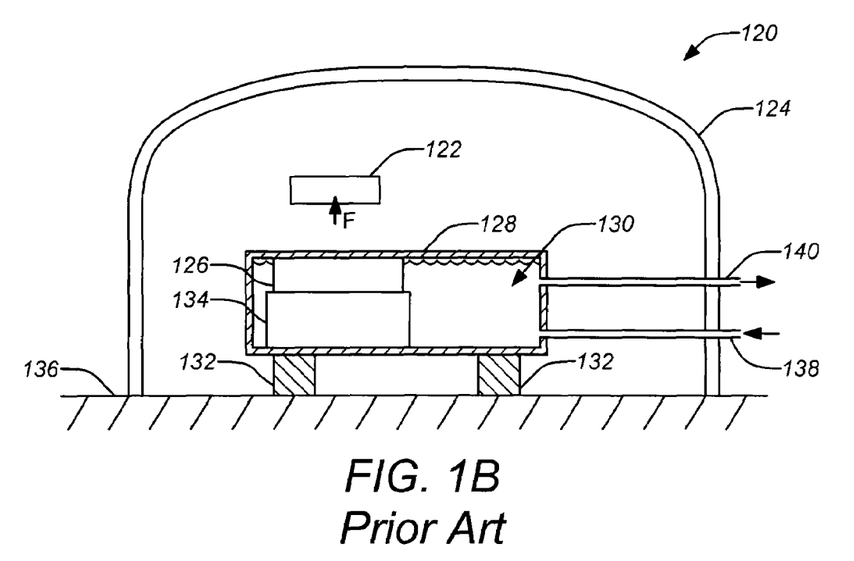

FIG. 1B illustrates another example of a conventional permanent magnet high-temperature superconducting levitation system 120. In this example, the permanent magnet 122 is shown levitated in vacuum enclosed by the surrounding vacuum chamber 124. The high-temperature superconductor 126 is situated inside a cryochamber 128 on a support 134 and bathed in a pool of boiling liquid nitrogen 130. One or more low thermal conductance mechanical supports 132 separate the cryochamber 128 that houses the high-temperature superconductor 126 from the fixed support 136 of the environment. The supply of liquid nitrogen may be regulated in some way through an inlet 138 and outlet 140 (e.g., fed via a pressure regulator from a pressurized Dewar, part of a thermosiphon loop, etc.). The cryogenic chamber 128 should be thermally isolated from the environment. It resides in a substantial vacuum, and radiation losses may be reduced by wrapping the chamber 128 with one or more layers of multi-layered insulation (MLI). MLI is typically a very thin sheet of mylar film with an even thinner film of aluminum evaporated onto it as is known in the art. The use of MLI is a standard practice in cryogenic technology. In addition, the mechanical supports 132 that connect the cryogenic chamber to the fixed support 136 of the environment should be of low thermal conductance; the thermal conduction of heat through the supports 132 should be reduced while continuing to provide sufficient mechanical strength.

One general difficulty in developing superconducting bearings and superconducting levitation systems arises from the inherently low damping of the bearing itself, especially at small vibrational amplitudes. The primary damping in a superconducting levitational system is due to magnetic hysteresis in the superconductor. To a first order, the cyclic energy loss of the system is proportional to the cube of the displacement from equilibrium and inversely proportional to the critical current density of the superconductor. Large criticial current densities are desirable to increase the levitational force and to decrease the amount of superconductor required. This system is particularly ineffective at damping small amplitude oscillations and whirls of levitated rotors.

Techniques to increase damping, such as applying eddy current dampers, can be used with superconducting bearings. For example, eddy current dampers could be employed by placing a copper sheet in close proximity to a levitated permanent magnet. Unfortunately, in rotating systems such dampers cause high rotational loss, as the inherent azimuthal magnetic field of the rotating magnet induces eddy currents that develop forces to oppose the rotation. This and other existing methods to increase damping cause much higher rotational loss, which reduces or negates the primary benefit of the superconducting bearing. Another technique is to combine an active magnetic bearing with the superconducting bearing to increase the damping as needed. This technique also increases the losses in the bearing system.

In view of the foregoing, there is a need in the art for apparatuses and methods to increase the damping of a superconducting bearing without sacrificing the low rotational loss. In addition, there is a need for such apparatuses and methods to operate with flywheel energy storage systems. There is further a need for such systems and apparatuses in space applications. These and other needs are met by the present invention as detailed hereafter.

SUMMARY OF THE INVENTION

Methods and apparatuses for improved damping in high-temperature superconducting levitation systems are disclosed. A superconducting element (e.g., a stator) generating a magnetic field and a magnet (e.g., a rotor) supported by the magnetic field are provided such that the superconducting element is supported relative to a ground state with damped motion substantially perpendicular to the support of the magnetic field on the magnet. Applying this, a cryostat housing the superconducting bearing may be coupled to the ground state with high damping but low radial stiffness, such that its resonant frequency is less than that of the superconducting bearing. The damping of the cryostat may be substantially transferred to the levitated magnetic rotor, thus, providing damping without affecting the rotational loss, as can be derived applying coupled harmonic oscillator theory in rotor dynamics. Thus, damping can be provided to a levitated object, without substantially affecting the rotational loss.

A typical embodiment of the invention comprises an apparatus for damping a superconducting levitation system including a superconducting element generating a magnetic field having a first resonance frequency between the superconducting element and a ground state and a magnet supported by the magnetic field generated by the superconducting element relative to a ground state having a second resonance frequency between the magnet and the superconducting element. The superconducting element is supported relative to the ground state with damped motion substantially perpendicular to the support of the magnetic field on the magnet such that the first resonance frequency is lower than the second resonance frequency. In an exemplary embodiment, the superconducting element may comprise a superconducting stator, while the magnet comprises a permanent magnet rotor, and the damped motion of the superconducting stator is substantially radial to the permanent magnet rotor. Further, the superconducting element may comprise an array of high-temperature superconductors. In some embodiments of the invention, damping of the damped motion may be provided by one or more dashpots coupled between the ground state and the superconducting element.

In further embodiments of the invention, cooling is provided with a cryostat thermally coupled to the superconducting element to maintain superconductivity of the superconducting element. The cryostat may comprise a cold head (using a gaseous helium working fluid) thermally coupled to the superconducting element and external to the damped motion of the superconducting element. In other embodiments, the cryostat may comprise a liquid nitrogen bath. In this case, damping of the damped motion may be provided by the superconducting element moving through the liquid nitrogen bath. In other embodiments, the liquid nitrogen bath may be circulated through an outlet and an inlet to and from an external liquid nitrogen system. The outlet and the inlet may comprise bellows couplings to allow the damped motion between the superconducting element and the ground state.

Similarly, a typical method embodiment of the invention for damping a superconducting levitation system, may comprise the steps of generating a magnetic field with a superconducting element having a first resonance frequency between the superconducting element and a ground state, supporting a magnet with the magnetic field generated by the superconducting element relative to a ground state having a second resonance frequency between the magnet and the superconducting element, and damping motion of the superconducting element substantially perpendicular to support of the magnetic field on the magnet relative to the ground state such that the first resonance frequency is lower than the second resonance frequency. Method embodiments of the invention may be further modified consistent with system and apparatus embodiments described herein.

Further, an apparatus embodiment of the invention for damping a superconducting levitation system, may include a superconducting means for generating a magnetic field having a first resonance frequency between the superconducting element and a ground state, a magnetic means for levitating under influence of the magnetic field generated by the superconducting element relative to a ground state having a second resonance frequency between the magnet and the superconducting element, and a damping means for damping motion of the superconducting element substantially perpendicular to support of the magnetic field on the magnet relative to the ground state such that the first resonance frequency is lower than the second resonance frequency. This apparatus may be further modified consistent with any method or apparatus embodiments described herein. For example, the apparatus may further include a cryostat means for cooling the superconducting element to maintain superconductivity of the superconducting element.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

As previously mentioned, embodiments of the invention can provide damping to a levitated object, and in particular, to a levitated rotating object without affecting the rotational loss. For the case of the superconducting bearing, a typical embodiment of the invention can include a permanent magnet (PM) rotor and a superconductor (SC) stator. In some embodiments, the rotor may rotate in a vacuum. Although embodiments of the invention are described with regard to a superconducting bearing and magnetic rotor, it should be noted that embodiments of the invention may be applied in general to any levitation system employing a superconductor as will be understood by those skilled in the art. Typically, the permanent magnet rotor may be disposed above the superconductor stator, but other configurations are also possible as will be understood by those skilled in the art. Further, the permanent magnet may be coupled to other components to form the complete rotor that is levitated under the influence of the superconductor. The superconductor may include multiple elements, such as an array of bulk high-temperature superconductors (HTSs). In addition, the magnetic rotor may comprise a complete rotating assembly in a flywheel assembly. To simplify the presentation, the magnetic rotor is shown herein as a single element throughout the description although actual implementations may comprise different shapes, additional parts and configurations depending upon the particular application as will be understood by those skilled in the art.

Furthermore, depending upon the temperature requirements, the superconductor is typically coupled to a cooling mechanism, a cryostat. In one embodiment, the cryostat comprises a cryogenic fluid. The superconductor may reside within the cryostat, bathed in the cryogenic fluid. Alternately, the superconductor may be disposed on a wall outside the cryostat. In this case, the hoses that allow cryogenic fluid to flow in and out of the cryostat are sufficiently flexible to provide minimal stiffness to the cryostat in the direction of the necessary damped motion. Many suitable flexible cryogenic fluid hoses are commercially available as known by those skilled in the art. In another embodiment, the superconductor may be disposed on a plate that is coupled by a thermal conductor to a cold head of a cryocooler. In this case, the thermal conductor, e.g., a braid of flexible, small-diameter, copper wire, can similarly provide minimal stiffness to the cryostat in the direction of the damped motion.

In general, the cryostat and supporting structure must exhibit low stiffness in the direction of the necessary damped motion. This can be achieved in a number of ways. For example, the cryostat may be suspended by wires or similar elements from above, so that it behaves like a pendulum. If the system geometry does not allow this, stiff wires (or buckling columns) can support the cryostat from below. The columns may be constructed so as not to buckle but providing easy deflection in the radial direction in the direction of the necessary damped motion. Furthermore, the cryostat may be coupled to ground by elements, such as a hydraulic dashpot, with high damping in the direction of the necessary damped motion (e.g., radially). In some embodiments, the cryostat may be disposed in an oil bath (or some other suitable fluid), and the motion of the cryostat through the oil would act as a viscous damper. If the radial thickness of the oil bath is sufficiently thin (between the cryostat and the chamber wall), damping similar to that of a squeeze-film damper may be achieved. In many applications it may be desirable for the cryostat to be thermally isolated from the damping mechanism. For example, if the cryostat includes a cryogenic fluid, its radial wall could comprise a double wall, providing by a vacuum layer, such as that used to insulate some beverage containers.

The analysis describing how the damping between the non-rotating cryostat and the ground is transferred to damping the radial displacement of the rotor follows from the phenomena of coupled harmonic oscillators and is well known in the study of foundations in rotor dynamics. Damping may be best transferred when the natural frequency of vibration of the cryostat is less that that of the rotor. Analytical modeling is described hereafter.

Embodiments of the invention may be used in many different applications and hardware configurations. Further, in some embodiments damping may be varied in real-time to optimize the performance of a system. For example, a damping oil may be heated or cooled to alter its viscosity. Similarly, the temperature of the cryocooler may be varied to adjust the damping characteristics of the rotor. While the description herein may be focused on a superconductor bearing, embodiments of the invention are applicable to almost any levitation system as will be understood by those skilled in the art.

Figure 2:
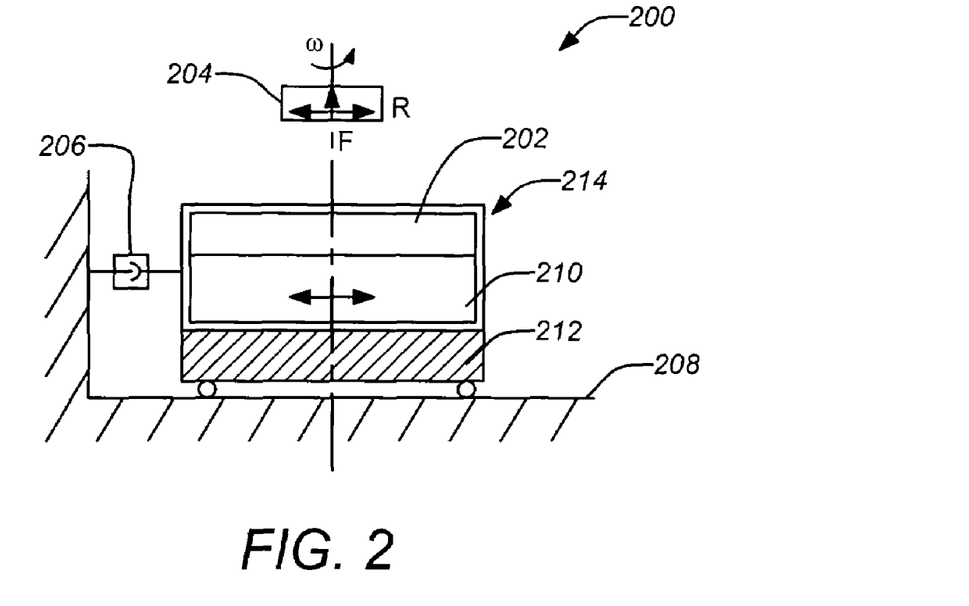
FIG. 2 is a schematic diagram of an exemplary embodiment of the invention using a permanent magnet high-temperature superconducting levitation system with damping.

FIG. 2 is a schematic diagram of an exemplary embodiment of the invention using a permanent magnet high-temperature superconducting levitation system 200 with damping. The generalized system 200 includes a superconducting element 202 (such as a stator 214 in a rotating system) that produces a magnetic field that levitates a magnet 204 (such as a rotor in a rotating system). The magnet 204 and superconducting element 202 are magnetically connected such that an equilibrium position exists between the two and there are magnetic restoring forces, R, that tend to keep the magnet 204 at the equilibrium position. Resonant frequencies are associated with small vibrations of the magnet 204 about this equilibrium. There is one resonant frequency for vibrations along the principal axis of the system and a separate radial resonant frequency for vibrations perpendicular to this axis. The superconducting element 202 is supported in a manner that allows it to translate in a direction substantially perpendicular to the supporting force F provided to the magnet 204 relative to a ground state 208. Support to the superconducting element 202 may be provided by any structure so long as a first resonance frequency between the superconducting element and ground is lower than a second resonance between the superconducting element and the magnet. For example, the structure may be a wire-suspended pendulum, a column structure, a spring and slider structure, or any other known configuration providing the proper resonant frequency relationship. These forces are applicable to all embodiments of the invention described herein, e.g. in FIGS. 3-10. There is a resonant frequency associated with the restoring force that governs small vibrations of the superconducting element relative to ground.

In addition, a damping means 206 is provided to damp motion in that direction. Damping from the damping means 206 is coupled to the levitated magnet 204. The damping is substantially transferred to the levitated magnet 204 when the resonant frequency of the superconducting element relative to ground is less than the radial resonant frequency of the magnet relative to the superconductor. In most practical applications, the superconducting element 202 will require cooling to maintain superconductivity. Thus, a cooling means 210 must be thermally coupled to the superconducting element 202. The superconducting element 202 and cooling means 210 together should be thermally isolated from the ground state with thermal insulation 212. This foundational principle can be applied to various levitation systems in many exemplary embodiments of the invention. The stator 214 can be considered to include the superconducting element 202, the cooling means 210 and the thermal insulation 212, essentially all the elements (other than the levitated magnet 204) that are isolated from the ground state 208.

With embodiments of the present invention, some of the interaction between the magnet and superconductor element is similar to conventional superconducting levitation systems. The superconductor element may be mounted on a platform of some type, either inside a cryogenic bath of attached to some conduction cooled device. Some damping is caused by the magnetic interaction between the levitated magnet and the superconductor element in a manner analogous to the operating principle of known eddy-current dampers. However, in this case the energy loss which causes the damping is due to the magnetic hysteresis in the superconductor element (as opposed to eddy currents). When the magnet oscillates (in either the radial or axial direction), the magnetic field seen by the superconductor element exhibits an AC component, and this AC induces a hysteretic loss. In terms of stiffness, the magnetic coupling is such that the bearing resonance frequency is typically lower than that of other bearings for rotating systems. (There is an advantage here in that one may go through the bearing critical at a low frequency, where the centrifugal forces are modest.)

In prior art systems, the supporting structures are rigid. Thus, there is the equivalent of a relatively stiff spring between the actual surface that holds the superconductor element and the ground. The stiff spring results in a high resonant frequency for vibrations of the superconductor element holder relative to ground. There is also a small amount of structural damping inherent in this rigid structure. When applied to the levitation system as a whole, the damping to the superconductor element holder is small, In addition, because the resonant frequency between the superconductor element holder and ground is higher than the resonant frequency between of the superconductor element holder and the magnet, any coupling of this damping to the levitated magnet is small. In contrast, embodiments of the present invention increase the damping between the superconductor element holder and the ground and also reduce the resonant frequency in the radial direction to be less than that between the superconductor element and the magnet, so that the damping is efficiently coupled to the levitated magnet for this mode of vibration. Stiffness will vary depending on the size of the system as necessary to achieve the required resonance frequencies. Applying this principle, embodiments of the invention may provide enhanced damping in either the radial or axial direction (but not both together).

However, in rotating systems it is almost always the radial direction that causes difficulties (because of the centrifugal force). Accordingly, examples described herein are described to damp in that direction (although the embodiments of the invention are not limited as such). In addition, the examples described herein employ a thrust bearing configuration to provide support in the axial direction, so stiffness between the superconductor element holder and ground in that direction must be high.

In prior art systems, the coupling between the holder and the ground is modeled as perfectly rigid because the stiffness is so high. It is convenient to make this stiffness high, because a center of geometry is defined for the system in doing so. Most other mechanical bearing systems can not tolerate the large radial excursion that a superconducting bearing can, so movement is restricted in conventional systems.

2. Exemplary Damped Superconducting Levitation Systems

Figure 3:
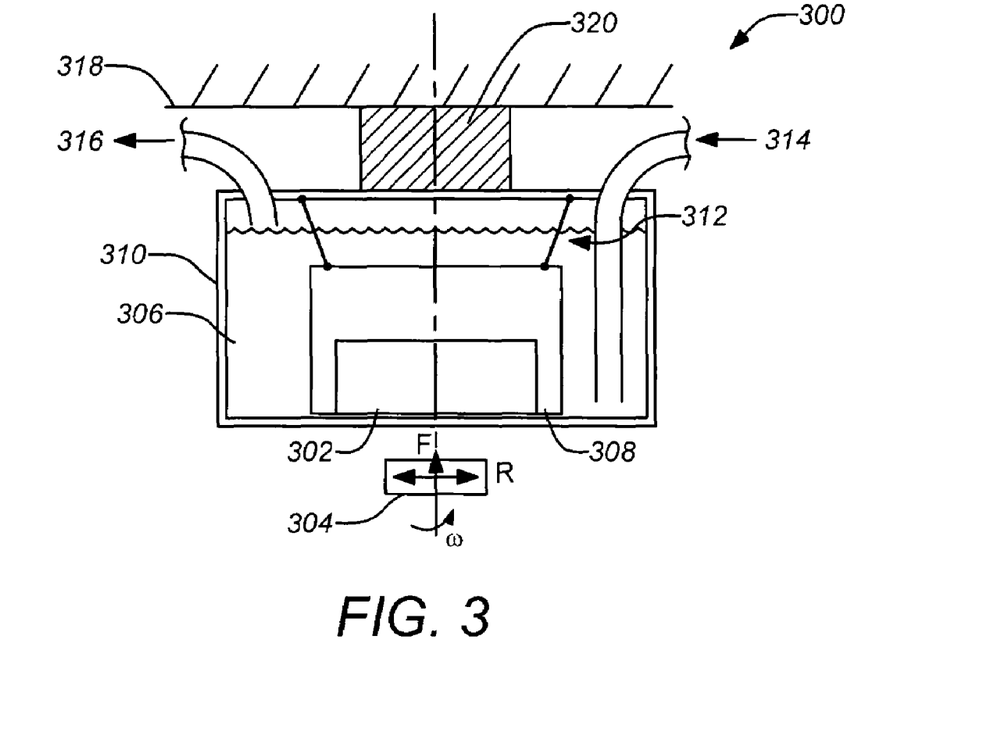
FIG. 3 illustrates an exemplary embodiment utilizing a common fluid for cooling and damping.

FIG. 3 illustrates an exemplary embodiment utilizing a common fluid for cooling and damping. In this system 300 configuration, the high-temperature superconductor element 302 is disposed above the levitated magnet 304. Damping is provided from the high-temperature superconductor element 302 being allowed to move laterally in its own cooling fluid bath 306 (e.g., of liquid nitrogen). This may be accomplished by suspending a mechanical holder 308 of the superconductor element 302 from the top of the inside of the cryochamber 310 with tension cables 312. (Equivalently, the tension cables may be solid linkages or any other mechanical assembly that allows substantially lateral motion of the holder 308 over relatively small oscillations. Alternatively, the tension cables may be attached directly to the superconductor and holder 308 eliminated, but this reduces the ability of the holder to offer a geometry for attachment independent of the shape of the superconductor.) The superconductor element 302 then swings like a pendulum through the liquid nitrogen, and the motion though the viscous fluid bath 306 provides damping. Cooling of the superconducting element 302 is also facilitated by circulating the fluid bath 306 through inlet 314 and outlet 316 to the cryochamber 310. Since boiling of liquid nitrogen is a primary cooling mechanism, the outlet is typically above the liquid surface to collect any boiloff gases. Further, the system 300 can be thermally isolated from the ground state 318 using a mechanical coupler 320 having a low thermal conductance. Use of three tension cables can constrain the superconductor element 302 and its holder 308 to move mostly in a lateral path with minimal tilting or vertical motion over the oscillation range. The angle of the tension cables relative to the vertical can be adjusted to change the restoring force of the superconductor element relative to ground. The resonant frequency of the superconductor relative to ground may be tuned by adjusting the mass of the mechanical holder 308. As previously mentioned, this resonant frequency should be less than that of the magnet 304 with the superconductor element 302. It should be noted that this system 300 provides the advantage that the inlet 314 and outlet 316 are static relatively to the ground state 318 so there is no need to have fluid conduits across a moving interface.

Figure 4:
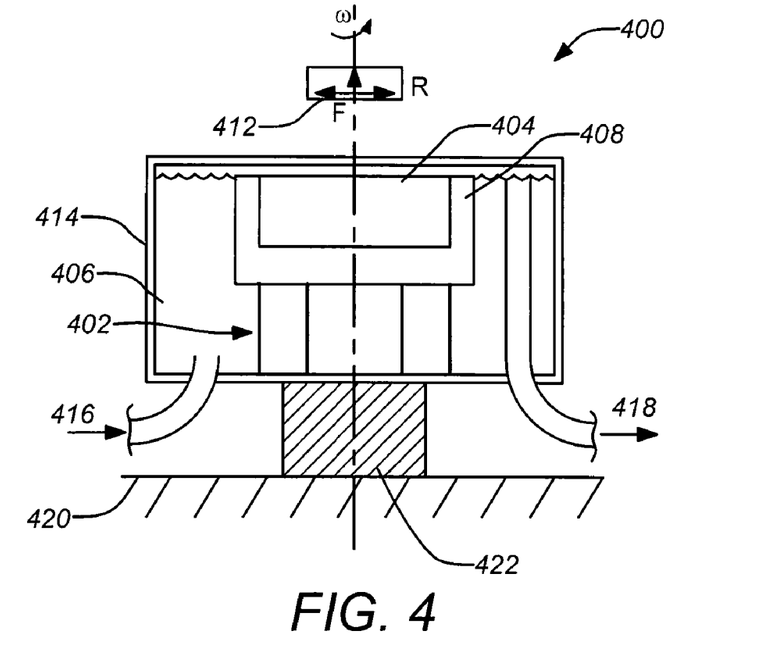
FIG. 4 illustrates another embodiment having column supports.

FIG. 4 illustrates another embodiment having column supports 402. This system 400 is an alternate configuration of the system 300 of FIG. 3 that allows the superconductor element 404 to slosh in the cooling fluid bath 406 (e.g. liquid nitrogen) for damping. In this system 400, the superconductor element 404 and its mechanical holder 408 are supported by columns 410 (e.g., multiple stiff wires) from below. These columns 410 allow substantially lateral motion, but not vertical motion in the direction of support of the magnet 412. Here also the cryochamber 414 has the fluid bath 406 circulated through an inlet 416 and outlet 418 and it is thermally isolated from the ground state 420 by the mechanical coupler 422. This system 400 supports the magnet 412 above the superconductor element 404, an inverted configuration from the system 300 of FIG. 3.

Figure 5A:
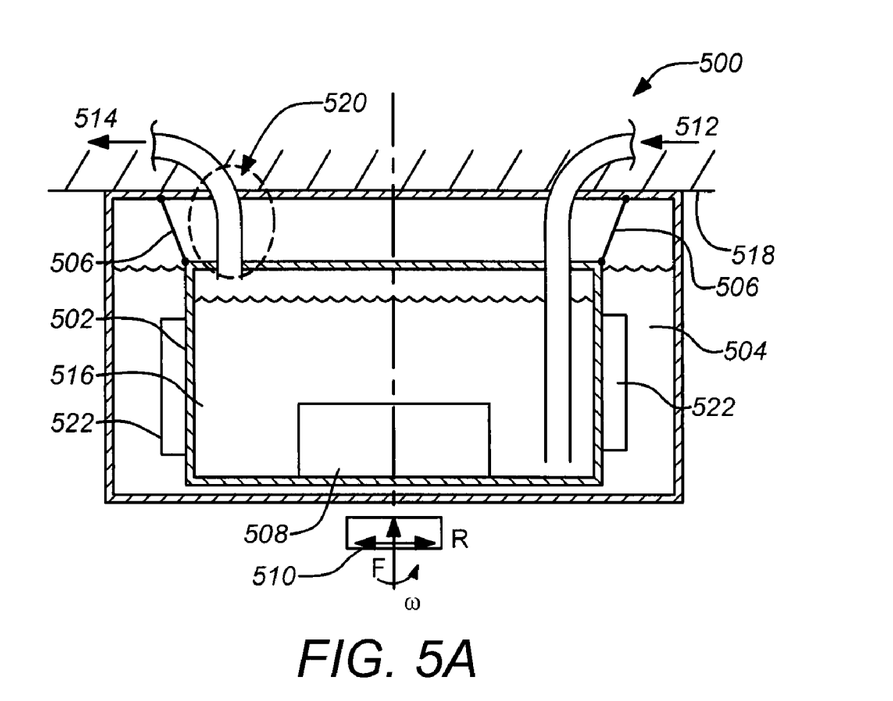
FIG. 5A illustrates an embodiment where damping is provided by movement through an oil bath.

FIG. 5A illustrates an embodiment where damping is provided by movement through an oil bath. In this system 500, the entire cryochamber 502 is suspended in an oil bath 504 by tension cables 506. Thus, the cryochamber 502 is allowed to swing like a pendulum, similar to the system 300 of FIG. 3. The advantage of this embodiment is that the cryochamber 502 will have more mass (and hence achieve a lower resonance frequency than other embodiments). The cryochamber 502 can slosh through the oil bath 504, which can have a significantly higher viscosity than liquid nitrogen and therefore obtain better damping. In addition, the cryochamber 502 will have a larger surface area in the oil than other embodiments. All these factors combine to yield a significantly higher damping coefficient. Further, one or more additional weights 522 may be added to the cryochamber 502 to tune the damping. On the other hand, it is undesirable that there is an additional surface between the superconductor element 508 and the magnet 510. Accordingly, it may be necessary that the levitation gap be made somewhat larger than other embodiments. In addition, this system 500 requires a more complex structure than some other embodiments described. For example, the cryochamber 502 must be sufficiently well insulated from the oil bath 504, so as not to freeze the oil bath 504. Further, the inlet 512 and outlet 514 for liquid nitrogen cooling bath 516 must be flexible to minimize any lateral stiffness to the cryochamber 502 relative to the ground state 518.

Figure 5B:
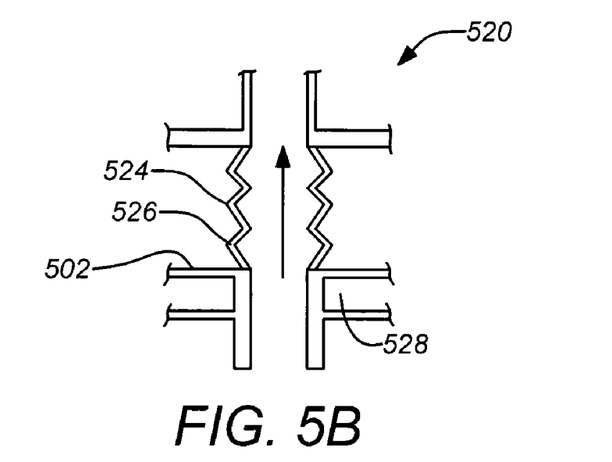
FIG. 5B illustrates coupling of the cooling fluid inlets and outlets across a moving interface.

FIG. 5B illustrates coupling of the cooling fluid inlet 512 and outlet 514 across a moving interface 520. The liquid nitrogen inlet 512 and outlet 514 can be composed of a metallic bellows 524. The metallic bellows 524 may comprise an inner and outer bellows separated by a vacuum insulation 526, a commercially available product. Further, the cryochamber 502 may also be fabricated with vacuum insulated walls 528, much like commercially available vacuum insulated thermos bottles.

Figure 6:
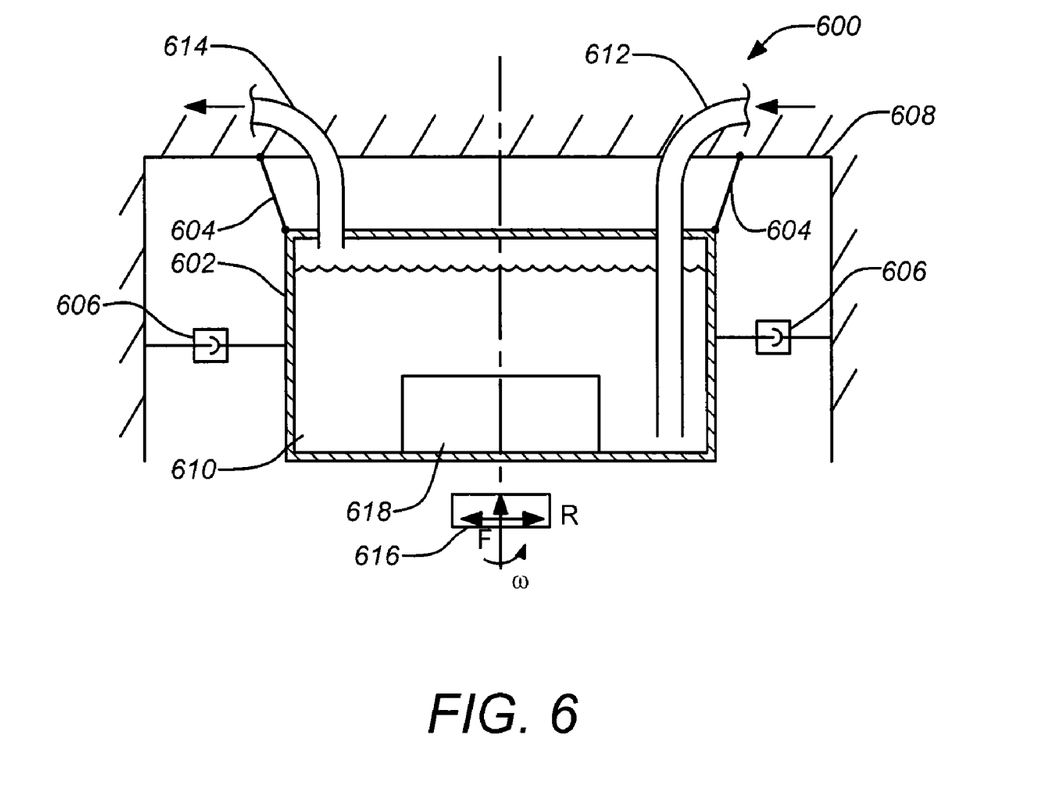
FIG. 6 illustrates another embodiment using one or more conventional dashpots for damping.

FIG. 6 illustrates another embodiment using one or more conventional dashpots for damping. This system 600 shows an alternate embodiment where the cryochamber 602 is suspended by tension cables 604 in vacuum and the external damping is provided by one or more dashpots 606 that couple the cryochamber 602 to the ground state 608. The dashpots 606 may be pneumatic, hydraulic, or any other suitable type known in the art. However, the dashpots 606 must be able to operate in vacuum. The liquid nitrogen cooling bath 610 inlet 612 and outlet 614 must be flexible, similar to those shown in the FIG. 5B embodiment. In this system 600, magnet 616 is disposed below the superconductor element 618.

Figure 7:
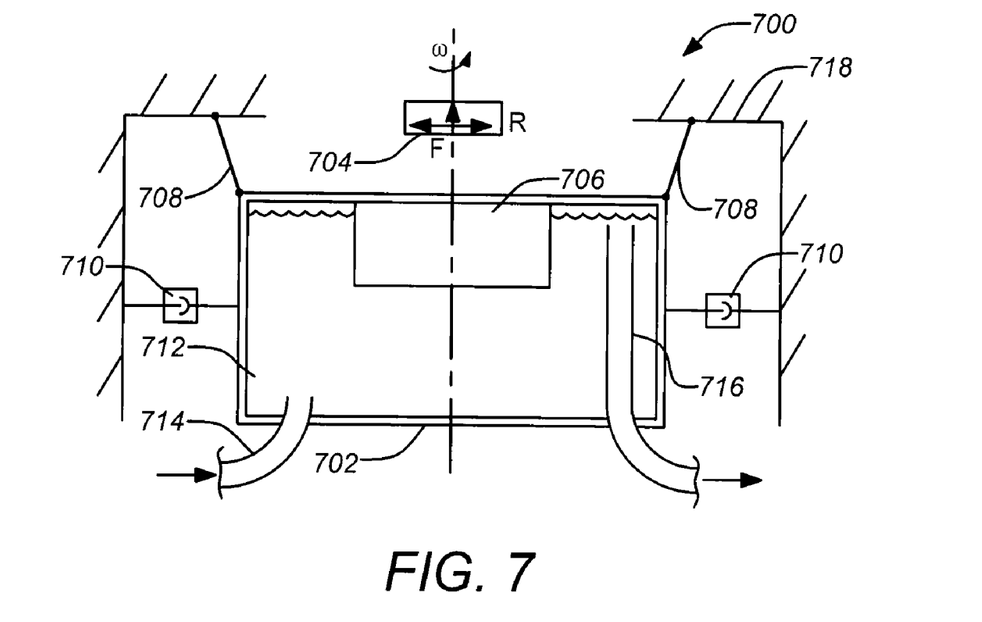
FIG. 7 illustrates another embodiment describing an alternate configuration of the embodiment in FIG. 6.

FIG. 7 illustrates another embodiment describing an alternate configuration of the embodiment in FIG. 6. This system 700 shows an alternate embodiment, in which the cryochamber 702 is suspended by tension cables 708 from the top in such a way that the magnet 704 can be levitated above the cryochamber 702. In this embodiment, the superconductor element 706 is attached to the inside of the upper wall of the cryochamber 702. Cooling of the superconductor element 706 is provided by circulating a cooling fluid bath 712 through the inlet 714 and outlet 716 (which traverses a moving interface as shown in FIG. 5B). External damping is provided by one or more dashpots 710 between the cryochamber 702 and a ground state 718 as with the embodiment described in FIG. 6.

Figure 8:
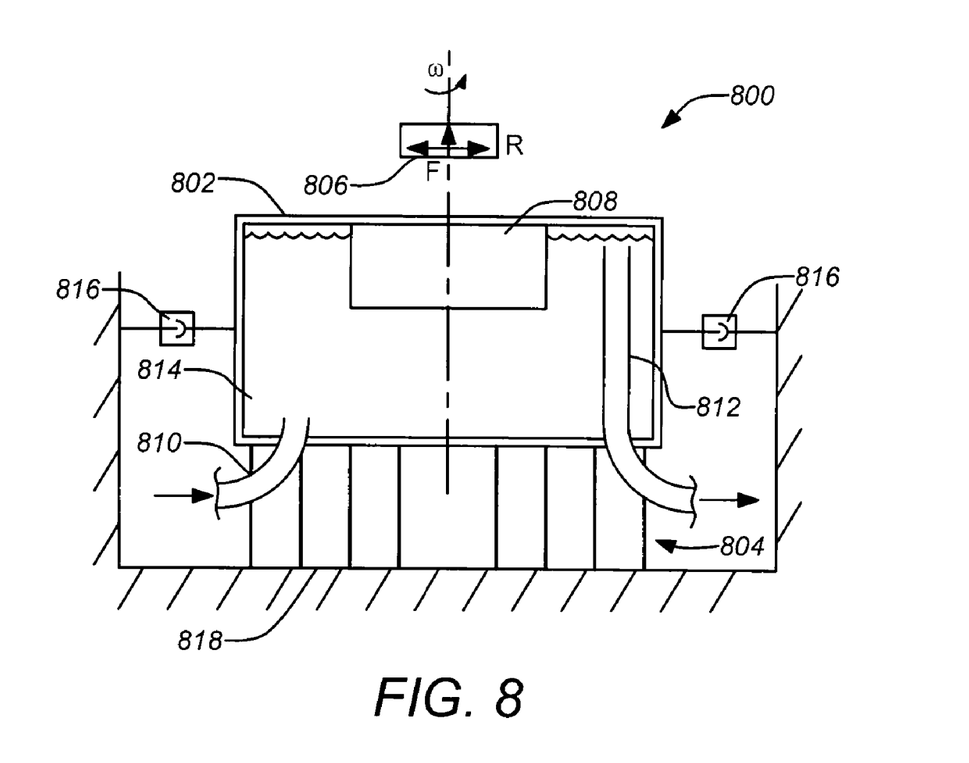
FIG. 8 illustrates another embodiment using one or more conventional dashpots and column supports.

FIG. 8 illustrates yet another embodiment using one or more conventional dashpots and column supports. This system 800 is very similar to the system 700 in FIG. 7, except that the cryochamber 802 is supported by columns 804 (e.g., stiff wires) from below, rather than tension cables 708. In this case, the magnet 806 is also supported above the superconductor element 808, the inlet 810 and outlet 812 circulate the cooling fluid bath 814 to cool the superconductor element 808, and one or more dashpots 816 damp motion between the cryochamber 802 and the ground state 818.

Figure 9:
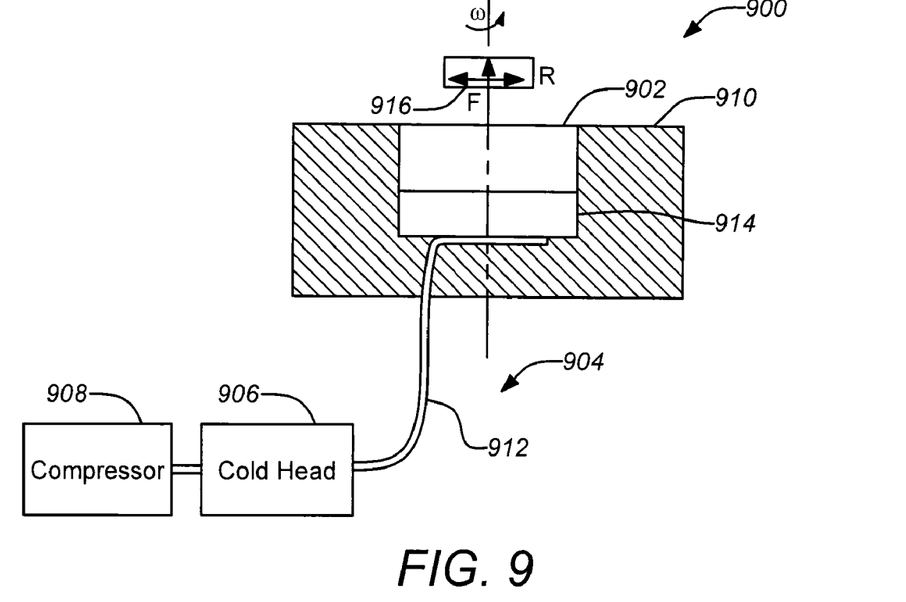
FIG. 9 illustrates another embodiment using a cryocooler.

FIG. 9 illustrates another embodiment using a cryocooler 904. One of the disadvantages of using a liquid nitrogen cooling system is that the temperature is limited to the freezing point of nitrogen. In addition, flexible liquid nitrogen feed lines can be somewhat expensive. The system 900 does not use a cooling fluid bath that must be circulated to the superconductor element 902. In this system 900, the cryostat cooling is provided by a cryocooler 904. One advantage of using a cryocooler 904 is that the working fluid is typically gaseous helium, so that temperatures considerably below the freezing point of nitrogen can be utilized, if desired. In addition, the cryocooler 904 may be implemented as a cold head 906 coupled to a compressor 908 such that the working fluid is isolated from the superconductor element 902 and its thermally insulated mechanical carrier 910. The cold head 906 is thermally coupled to the superconductor element 902, whereas the working fluid connects the cold head 906 to the compressor. Any other suitable cryocooler system may also be used. However, they all employ a cold head 906 of some type which is coupled to a thermally conductive path 912 to remove heat. In this system 900, the thermally conductive path 912 comprises a flexible braided copper wire that runs from the cold head to a thermal bus 914. The thermal bus 914 (e.g., a solid or slotted copper plate) conductively coupled to the superconductor element 902. The mechanical carrier 910 can be suspended by tension cables or supported by rigid wires as described in any of the previous embodiments of FIGS. 2-8. In addition, damping can also be provided by attaching dashpots between the superconductor element 902 assembly and a ground state, as previously described. Similarly, the system 900 may be configured to support a magnet 916 either above or below the superconductor element 902 as described in any of the previous embodiments.

Figure 10:
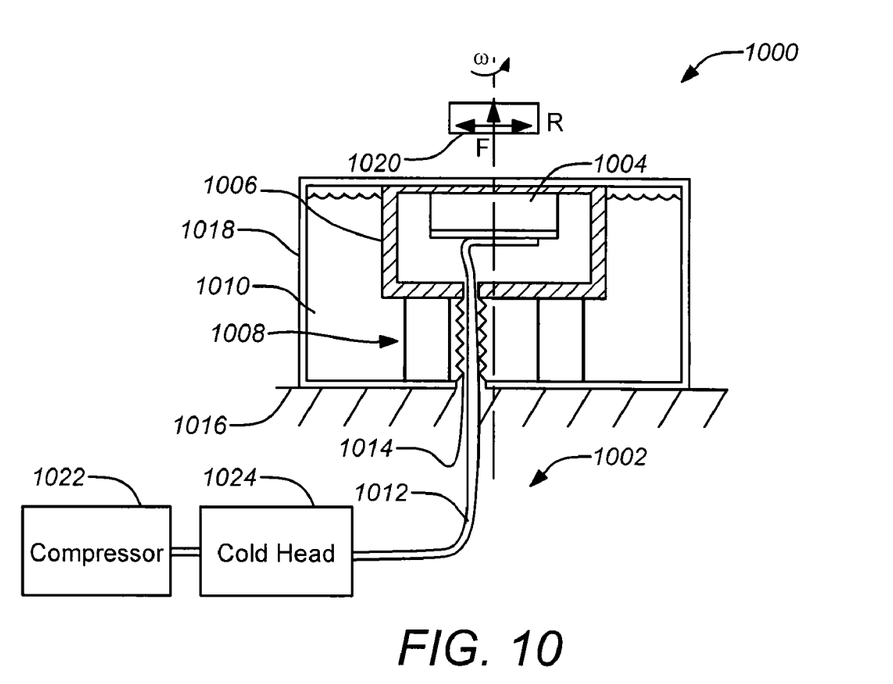
FIG. 10 illustrates another embodiment using a cryocooler and oil bath damping.

FIG. 10 illustrates an exemplary embodiment using a cryocooler 1002 and oil bath damping and column supports. This system 1000 employs a flexible copper braid conductive path 1012 connecting the superconductor element 1004 to a cryocooler 1002. In this embodiment, the mechanical carrier 1006 is supported by columns 1008 (e.g., stiff wires) in an oil bath 1010. The mechanical carrier 1006 walls should be well insulated, as before. Also, there must be a flexible tube 1014 through which the conductive path 1012 can traverse through the chamber 1018 containing the oil bath to enter the cryogenic chamber housing the superconductor element 1004 and allow substantially lateral damped motion of the mechanical carrier 1006 relative to a ground state 1016. The magnet 1020 is levitated above the superconductor element 1004 in this system 1000. The cryocooler 1002 comprises a compressor 1022 and cold head 1024 operating similar to the embodiment of FIG. 9.

Figure 11:
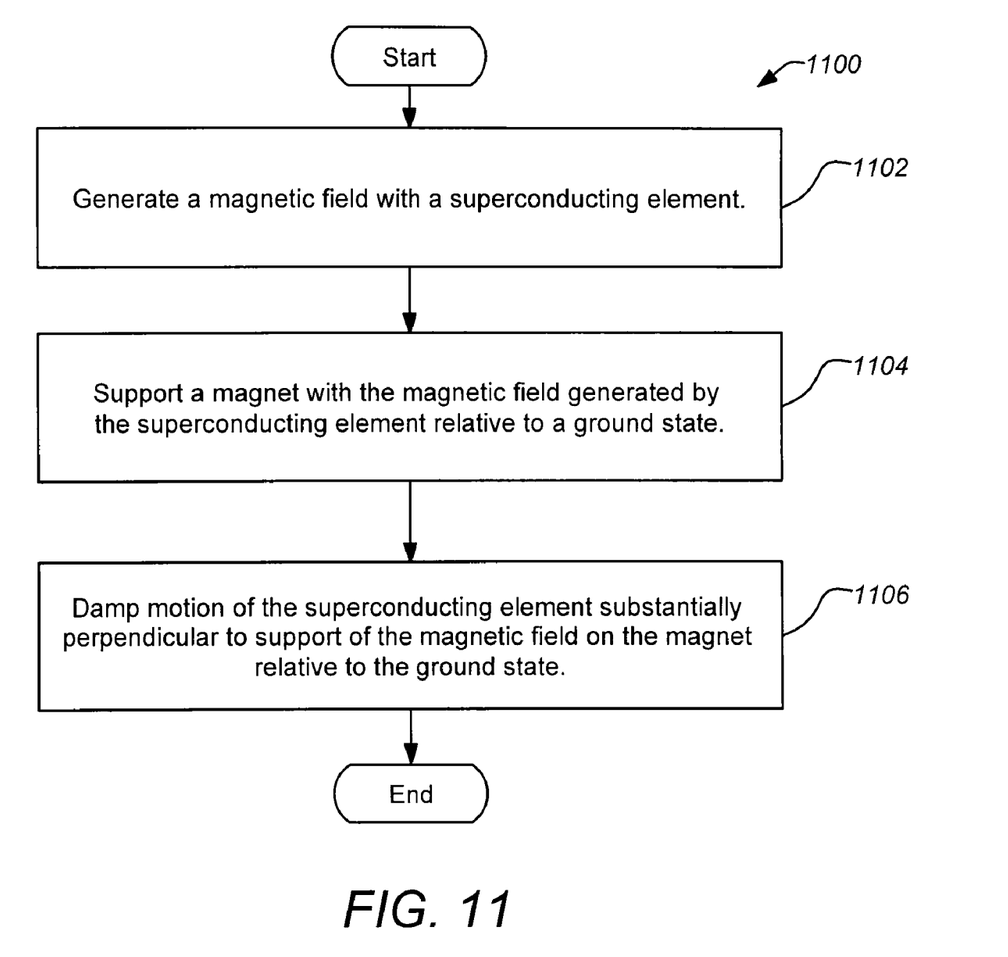
FIG. 11 is a flowchart of an exemplary method of damping a levitation system.

FIG. 11 is a flowchart of an exemplary method 1100 of establishing damping in a superconducting levitation system. The method 1100 begins with an operation 1102 of generating a magnetic field with a superconducting element. Next in operation 1104, a magnet is supported with the magnetic field generated by the superconducting element relative to a ground state. Finally, in operation 1106 motion of the superconducting element is damped substantially perpendicular to support of the magnetic field on the magnet relative to the ground state. The method 1100 may be further modified consistent with the systems described herein.

3. Analysis of Damping in a Superconducting Levitation System

The applicable analytical basis for embodiments of the invention can be begin with an analytical model of a single damped harmonic oscillator. The single mass, m, is disposed on a spring with constant, k and damping, c. The displacement of the mass is x measured parallel to the spring force. The motion is described by the following equation.

$$m\ddot{x} + c\dot{x} + kx = F(t) = F_0 e^{i\omega t}$$

Where F is the force at time t. We choose t=0 so that the constant $F_0$ is real. The solution is of the form $x = Ae^{pt}$, where A and p are complex. For free vibrations, $F_0 = 0$ $(p^2 Am + pAc + kA)e^{pt} = 0$ and $\omega_0 = \sqrt{k}\sqrt{k/m}$ is the resonant frequency.

$$mp^2 + cp + k = 0$$

so $$p = \frac{-c \pm \sqrt{c^2 - 4km}}{2m}$$

If $c^2 > 4$ km, the system is overdamped as follows.

$$x = A_1 e^{-\lambda_1 t} + A_2 e^{-\lambda_2 t}$$

where $$\lambda_1 = \frac{c + \sqrt{c^2 - 4km}}{2m}$$

and $$\lambda_2 = \frac{c - \sqrt{c^2 - 4km}}{2m}.$$

If $c^2 < 4$ km, the system is underdamped as follows.

$$x = Ae^{-\lambda t}e^{\pm i\omega_1 t}$$

where $$\lambda = \frac{c}{2m}$$

and $$\omega = \sqrt{\frac{k}{m} - \frac{c}{4m^2}}$$

For forced vibrations, $F_0 \neq 0$
$x = Ae^{i\omega t}$ and A is complex.

$$(-m\omega^2 + ic\omega + k)Ae^{i\omega t} = F_0 e^{i\omega t} \quad \text{(A1)}$$

Then $$A = \frac{F_0}{[(k-m\omega^2) + i\omega c]} \frac{[(k-m\omega^2) - i\omega c]}{[(k-m\omega^2) - i\omega c]}$$

$$= \frac{F_0[(k-m\omega^2) - i\omega c]}{(k-m\omega^2)^2 + \omega^2 c^2}$$

Thus, $\dfrac{A}{F_0} = |A|e^{-i\delta}$ and $|\bar{A}|^2 = \dfrac{(k-m\omega^2)^2 + \omega^2 c^2}{[(k-m\omega^2)^2 + \omega^2 c^2]^2}$ so $|\bar{A}| = \dfrac{1}{\sqrt{[(k-m\omega^2)^2 + \omega^2 c^2]}}$ and $\tan\delta = \dfrac{\omega c}{k - m\omega^2} = \dfrac{\omega c m}{\omega_0^2 - \omega^2}$ When $\omega = 0$: $\delta = 0$, $|A| = F_0|\bar{A}| = \dfrac{F_0/m}{\sqrt{\omega_0^2}} = F_0/k$ \quad (A2)

When $\omega \to \infty$: $\delta = \pi$, $|A| \to 0 \to \dfrac{F_0/m}{\omega^2}$ When $\omega = \omega_0$: $\delta = \pi/2$, $|A| = \dfrac{F_0/m}{\omega c/m} = \dfrac{F_0}{\omega_0 c}$ Applying initial conditions when $c^2 > 4$ km, at t=0: $x = x_0$, $\dot{x} = v_0$, then $A_1 + A_2 = x_0$ and $-\lambda_1 A_1 - \lambda_2 A_2 = v_0$.

Applying initial conditions when $c^2 < 4$ km, at t=0: $x = x_0$, $\dot{x} = v_0$, $A = A_0 e^{-i\delta} = A_0 \cos\delta - iA_0\sin\delta$, $A\cos\delta = x_0$, then $(-\lambda \pm i\omega) A_0(\cos\delta + i\sin\delta) = -v_0 \pm \omega\cos\delta - \lambda\sin\delta = 0$ and $$\tan\delta = \frac{\pm\omega}{\lambda} = \pm\sqrt{\frac{4mk}{c^2} - 1}$$

Let $F_0 = em\omega^2$, where e is the center of mass offset in a rotational system. From Equation (A2), $$\left|\frac{\bar{A}}{e}\right| = \frac{1}{\sqrt{\left[\left(\frac{\omega_0^2}{\omega^2} - 1\right)^2 + \left(\frac{c}{m\omega}\right)^2\right]}}$$

$\omega \to 0$, $\left|\dfrac{A}{e}\right| \to (\omega/\omega_0)^2$ $\omega \to \infty$, $\left|\dfrac{A}{e}\right| \to 1$ c mainly affects the size of the peak resonance.

Figure 12A:
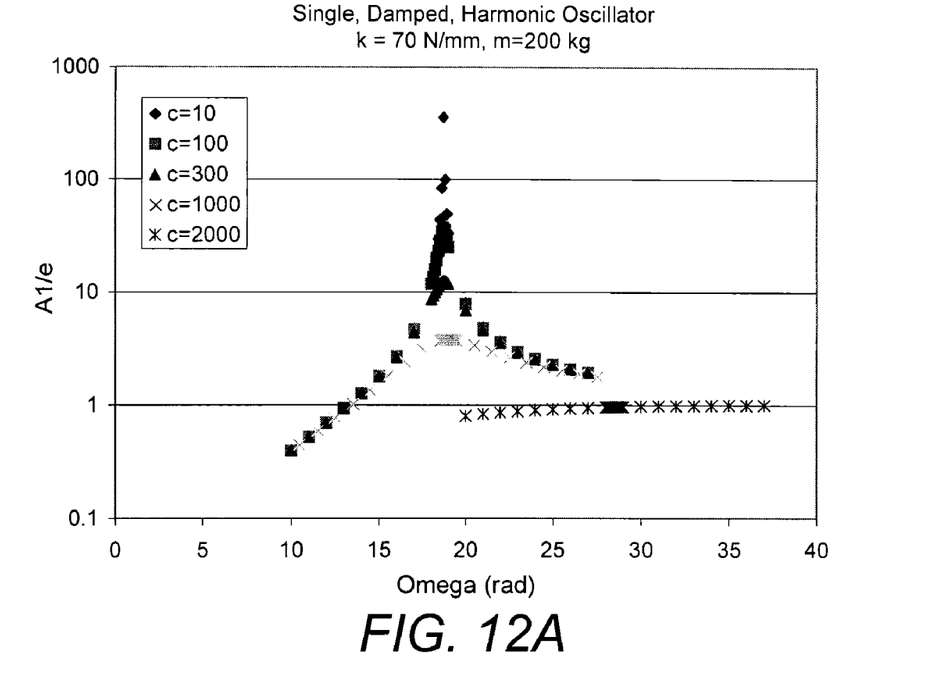
FIG. 12A is a plot of damping on a single mass damped harmonic oscillator.

FIG. 12A is a plot of damping on a single mass damped harmonic oscillator. A mass of 200 kg is oscillated on a spring with a rate of 70 N/mm. Different plots of $A_1/e$ versus oscillation frequency are shown under damping values varied from 10 to 2000 kg/s.

Next an analytical model of two, coupled and damped harmonic oscillators can be developed. This problem is often addressed in texts on mechanics, e.g., see K Symon (1960), pp. 188-197. The system is modeled as a first mass, m1, coupled to a second mass, m2 through both a spring, k1, and a damper, c1, where k1 is the spring coefficient and c1 is the damping coefficient. In turn, the second mass is coupled to a ground state through a second spring, k2 and a second damper, c2. Under the forcing function $F(t) = F_0 e^{i\omega t}$, displacement of the first mass is given by x1 and the displacement of the second mass is given by x2, both in the same direction parallel to the springs and dampers. The motion equations are given as follows.

$$m_1\ddot{x}_1 + c_1(\dot{x}_1 - \dot{x}_2) + k_1(x_1 - x_2) = F(t) \quad \text{(B1)}$$

$$m_2\ddot{x}_2 + c_2\dot{x}_2 + k_2 x_2 - c_1(\dot{x}_1 - \dot{x}_2) - k_1(x_1 - x_2) = 0 \quad \text{(B2)}$$

If $F_0 = 0$, $c_1 = c_2 = 0$, then $$m_1\ddot{x}_1 + k_1(x_1 - x_2) = 0 \quad \text{(B3)}$$

$$m_2\ddot{x}_2 + (k_1 + k_2)x_2 - k_1 x_1 = 0 \quad \text{(B4)}$$

Frequencies are now defined for the condition when one mass is held fixed as follows. $\omega_{10} = \sqrt{k_1/m_1}$, $\omega_{20} = \sqrt{(k_1+k_2)/m_2} = \sqrt{k'_2/m_2}$, where $k'_2 = k_1 + k_2$.

To derive the solution, apply $$x_1 = A_1 e^{pt}, \quad x_2 = A_2 e^{pt}$$

$$(m_1 p^2 + k_1)A_1 - k_1 A_2 = 0 \quad \text{(B5)}$$

$$(m_2 p^2 + k'_2)A_2 - k_1 A_1 = 0 \quad \text{(B6)}$$

$$\frac{A_2}{A_1} = \frac{m_1 p^2 + k_1}{k_1} = \frac{k_1}{mp^2 + k'_2} \quad \text{(B7)}$$

Solve equation (B7) for the secular equation.

$$(m_1 p^2 + k_1)(m_2 p^2 - k'_2) - k_1^2 = 0 \quad \text{(B8)}$$
$$m_1 m_2 p^4 + (k_1 m_2 + k'_2 m_1)p^2 + k_1(k'_2 - k_1) = 0$$

$$m_1 m_2 p^4 + (k_1 m_2 + k'_2 m_1)p^2 + k_1 k_2 = 0 \quad \text{(B8A)}$$

$$p^2 = -\frac{1}{2}\left(\frac{k_1}{m_1} + \frac{k'_2}{m_2}\right) \pm \left[\frac{1}{4}\left(\frac{k_1}{m_1} + \frac{k'_2}{m_2}\right)^2 - \frac{k_1 k_2}{m_1 m_2}\right]^{1/2}$$

$$= -\frac{1}{2}(\omega_{10}^2 + \omega_{20}^2) \pm \left[\frac{1}{4}(\omega_{10}^2 + \omega_{20}^2)^2 - \omega_{10}^2 \omega_2^2\right]^{1/2}$$

$\omega_2^2 = \dfrac{k_2}{m_2}$ and $\omega_3^2 = \dfrac{k_1}{m_2}$ $$p^2 = -\frac{1}{2}(\omega_{10}^2 + \omega_{20}^2) \pm \left[\frac{1}{4}(\omega_{10}^2 - \omega_{20}^2)^2 - \omega_{10}^2 \omega_3^2\right]^{1/2} \quad \text{(B9)}$$

Now showing that $p^2 = 0$, take the positive sign of the square root and compare by squaring.

$$(\omega_{10}^2 + \omega_{20}^2)^2 \overset{?}{>} (\omega_{10}^2 - \omega_{20}^2) + 4\omega_{10_3}^2$$

$$\omega_{10}^2 \omega_{20}^2 \overset{?}{>} \omega_{10}^2 \omega_3^2, \text{ so } \omega_{20}^2 \overset{?}{>} \omega_3^2$$

So it is true that $k_1+k_2>k_1$

The case of interest is $m_1>m_2$, therefore $\omega_{20}>\omega_{10}$.

$$-p^2 = \frac{(\omega_{10}^2 + \omega_{20}^2)}{2} \mp \frac{1}{2}(\omega_{20}^2 - \omega_{10}^2)\left[1 + \frac{4\omega_{10}^2 \omega_3^2}{(\omega_{20}^2 - \omega_{10}^2)^2}\right]^{1/2} \quad \text{(B10)}$$

$$\text{Let } \Delta\omega^2 = (\omega_{20}^2 - \omega_{10}^2)\left[\left(1 + \frac{4\omega_{10}^2 \omega_3^2}{(\omega_{20}^2 - \omega_{10}^2)^2}\right)^{1/2} - 1\right] \quad \text{(B11)}$$

The two solutions for $-p^2$ are $$-p^2 = \omega_2^2 = \omega_{20}^2 + \frac{1}{2}\Delta\omega^2, \text{ the high frequency solution} \quad \text{(B12A)}$$

$$-p^2 = \omega_1^2 = \omega_{10}^2 - \frac{1}{2}\Delta\omega^2, \text{ the low frequency solution} \quad \text{(B12B)}$$

The four solutions are $$p=\pm i\omega_1, \pm i\omega_2$$

Looking at the high frequency solution yields the following.

$$p^2 = -\omega_2^2 = -\omega_{20}^2 - \frac{1}{2}\Delta\omega^2$$

From equation (B7)

$$\frac{A_2}{A_1} = \frac{m_1 p^2 + k_1}{k_1} = 1 + \frac{p^2}{\omega_{10}^2} = 1 - \frac{\omega_{20}^2}{\omega_{10}^2} - \frac{\Delta\omega^2}{2\omega_{10}^2} \quad \text{(B13)}$$

$$\frac{A_2}{A_1} = 1 - \frac{\omega_{20}^2}{\omega_{10}^2} + \frac{\omega_{20}^2 - \omega_{10}^2}{2\omega_{10}^2} - \frac{(\omega_{20}^2 - \omega_{10}^2)}{2\omega_{10}^2}\sqrt{1 + \frac{4\omega_3^2/\omega_{10}^2}{(\omega_{20}^2 - \omega_{10}^2)}}$$

$$= -\frac{1}{2}\left(\frac{\omega_{20}^2}{\omega_{10}^2} - 1\right)\left[1 + \sqrt{\frac{4\omega_3^2/\omega_{10}^2}{\left(\frac{\omega_{20}^2}{\omega_{10}^2} - 1\right)}}\right]$$

The square root term is approximately 1 and $\omega_{20}>\omega_{10}$. Therefore $A_2>A_1$ and they oscillate out of phase.

$$\frac{A_2}{A_1} = -\frac{1}{2}\left(\frac{\omega_{20}^2}{\omega_{10}^2} - 1\right)\left[1 + \sqrt{1 + \frac{4m_1/m_2}{\left(\frac{\omega_{20}^2}{\omega_{10}^2} - 1\right)^2}}\right] \quad \text{(B14)}$$

With $\omega_{20} >> \omega_{10}$ $$\frac{A_2}{A_1} \approx -\frac{1}{2}\frac{\omega_{20}^2}{\omega_{10}^2}\left[1 + \sqrt{1+\varepsilon}\right] \approx -\frac{\omega_{20}^2}{\omega_{10}^2} \quad \text{(B15)}$$

Now looking at the low frequency solution yields the following.

$$p^2 = -\omega_1^2 = -\omega_{10}^2 + \frac{1}{2}\Delta\omega^2 \quad \text{(B16)}$$

$$\frac{A_2}{A_1} = 1 + \frac{p^2}{\omega_{10}^2} = \frac{1}{2}\frac{\Delta\omega^2}{\omega_{10}^2} = \frac{1}{2}\left(\frac{\omega_{20}^2}{\omega_{10}^2} - 1\right)\left[\sqrt{1 + \frac{4m_1/m_2}{\left(\frac{\omega_{20}^2}{\omega_{10}^2} - 1\right)^2}} - 1\right]$$

The square root is of form $\sqrt{1+4\epsilon} \approx 2\epsilon$ $$\frac{A_2}{A_1} \approx \frac{1}{2}\left(\frac{\omega_{20}^2}{\omega_{10}^2} - 1\right)\frac{2m_1/m_2}{\left(\frac{\omega_{20}^2}{\omega_{10}^2} - 1\right)^2} \quad \text{(B17)}$$

It is more convenient to take the following.

$$\frac{A_2}{A_1} \approx \frac{m_1}{m_2}\left(\frac{\omega_{20}^2}{\omega_{10}^2} - 1\right) \approx \frac{m_1}{m_2}\frac{(k_1+k_2)}{m_2}\frac{m_3}{k_2} \approx \frac{m_1^2}{m_2^2}\frac{k_2}{k_1} \quad \text{(B18)}$$

For the low frequency solution, the masses oscillate in phase and $A_1$ has the largest amplitude. The ratio of amplitudes is larger for the low frequency solution compared with the high frequency solution.

A general solution may be determined as follows for $c_1, c_2$, $F_0 \neq 0$.

$$m_1\ddot{x}_1 + c_1(\dot{x}_1 - \dot{x}_2) + k_1(x_1 - x_2) = F_0 e^{i\omega t} \quad \text{(C1)}$$

$$m_2\ddot{x}_2 + c_2\dot{x}_2 + k_2 x_2 - c_1(\dot{x}_1 - \dot{x}_2) - k_1(x_1 - x_2) = 0 \quad \text{(C2)}$$

Solutions are of the following form.

$$x_1 = A_1 e^{i\omega t}, \quad x_2 = A_2 e^{i\omega t} \quad \text{(C3)}$$

$$-\omega^2 m_1 A_1 + i\omega c_1 A_1 - i\omega c_1 A_2 + k_1 A_1 - k_1 A_2 = F_0 \quad \text{(C4)}$$

$$-\omega^2 m_2 A_2 + i\omega c_2 A_2 + k_2 A_2 - i\omega c_1 A_1 + i\omega c_1 A_2 - k_1 A_1 + k_1 A_2 = 0 \quad \text{(C5)}$$

Grouping terms yields the following.

$$A_1(k_1 - \omega^2 m_1 + i\omega c_1) + A_2(-k_1 - i\omega c_1) = F_0$$

$$A_1(-k_1 - i\omega c_1) + A_2(k_2' - \omega^2 m_2 + i\omega c_2') = 0,$$

where $k_2' = k_1 + k_2$ and $c_2' = c_1 + c_2$ $$\omega_{10}^2 = \frac{k_1}{m_1}, \omega_{20}^2 = \frac{k_2'}{m_2}, \omega_3^2 = \frac{k_1}{m_2}, \text{ and } F_0 = em_1\omega^2$$

$$\gamma_1 = \frac{c_1}{m_1}, \gamma_2 = \frac{c_2'}{m_2}, \text{ and } \gamma_3 = \frac{c_1}{m_2}$$

$$A_1\left(\frac{\omega_{10}^2}{\omega^2} - 1 + \frac{i\gamma_1}{\omega}\right) + A_2\left(-\frac{\omega_{10}^2}{\omega^2} - \frac{i\gamma_1}{\omega}\right) = e$$

$$A_1\left(\frac{-\omega_3^2}{\omega^2} - \frac{i\gamma_3}{\omega}\right) + A_2\left(\frac{\omega_{20}^2}{\omega^2} - 1 + \frac{i\gamma_2}{\omega}\right) = 0$$

$$\text{Let } D = \begin{bmatrix} \frac{\omega_{10}^2}{\omega^2} - 1 + \frac{i\gamma_1}{\omega} & -\frac{\omega_{10}^2}{\omega^2} - \frac{i\gamma_1}{\omega} \\ \frac{-\omega_3^2}{\omega^2} - \frac{i\gamma_3}{\omega} & \frac{\omega_{20}^2}{\omega^3} - 1 + \frac{i\gamma_2}{\omega} \end{bmatrix} \quad \text{(C6)}$$

$$\frac{A_1}{e} = \left(\frac{\omega_{20}^2}{\omega^2} - 1 + \frac{i\gamma_2}{\omega}\right) / D \quad \text{(C7)}$$

-continued $$\frac{A_2}{e} = \left(\frac{\omega_3^2}{\omega^2} + \frac{i\gamma_3}{\omega}\right)/D \quad (C8)$$

$a_r = \omega_{10}^2/\omega^2 - 1, \; a_i = \gamma_1/\omega$
$b_r = -\omega_{10}^2/\omega^2, \; b_i = -\gamma_1/\omega$
$c_r = -\omega_3^2/\omega^2, \; c_i = -\gamma_3/\omega$
$d_r = \omega_{20}^2/\omega^2 - 1, \; d_i = \gamma_2/\omega$
$D = D_R + iD_I$
$D_R = a_r d_r - a_i d_i - b_r c_r + b_i c_i$
$D_I = a_i d_r + a_r d_i - b_i c_r - b_r c_i$
$A_1 = A_{1r} + iA_{1i}$ and $A_2 = A_{2r} + iA_{2i}$ $$\frac{A_{1r}}{e} = \frac{d_r D_R + d_i D_I}{D_R^2 + D_I^2} \text{ and } \frac{A_{1i}}{e} = \frac{d_i D_R - d_r D_I}{D_R^2 + D_I^2}$$

$$\frac{A_{2r}}{e} = \frac{-c_r D_R - c_i D_I}{D_R^2 + D_I^2} \text{ and } \frac{A_{2i}}{e} = \frac{-c_i D_R + c_r D_I}{D_R^2 + D_I^2}$$

$$\frac{A_1}{e} = \frac{|A_1|}{e} e^{i\delta_1}$$

$$\frac{|A_1|}{e} = \frac{\sqrt{(d_r D_R + d_i D_I)^2 + (d_i D_R - d_r D_I)^2}}{D_R^2 + D_I^2};$$

$$\tan\delta_1 = \frac{d_i D_R - d_r D_I}{d_r D_R + d_i D_I}$$

$$\frac{|A_2|}{e} = \frac{\sqrt{(c_r D_R + c_i D_I)^2 + (c_i D_R - c_r D_I)^2}}{D_R^2 + D_I^2}; \tan\delta_2 = \frac{c_i D_R - c_r D_I}{c_r D_R + c_i D_I}$$

The resulting equation can be conveniently entered into a spreadsheet (or similar program) to examine the results graphically.

Figure 12B:
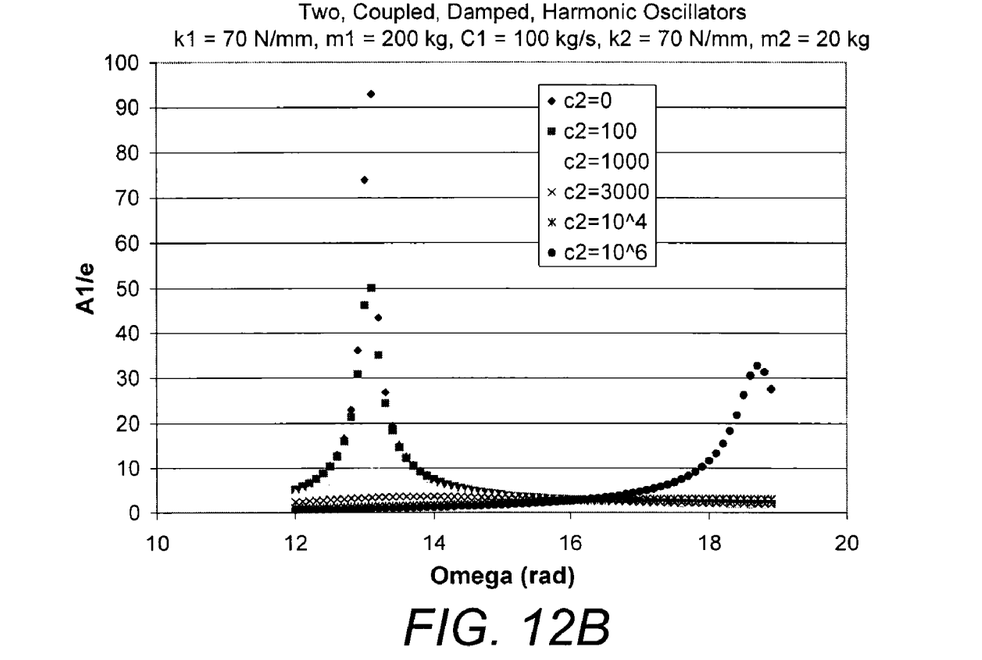
FIGS. 12B-12D are plots of damping on for a dual mass damped harmonic oscillators.
Figure 12C:
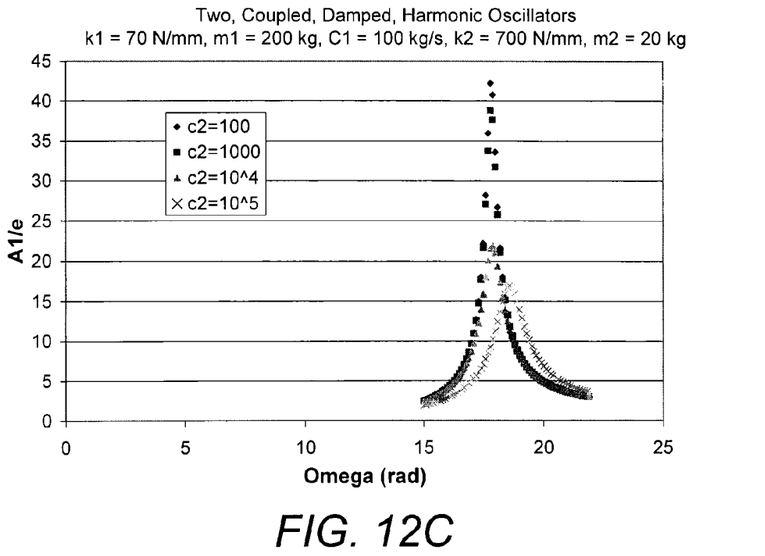
Figure 12D:
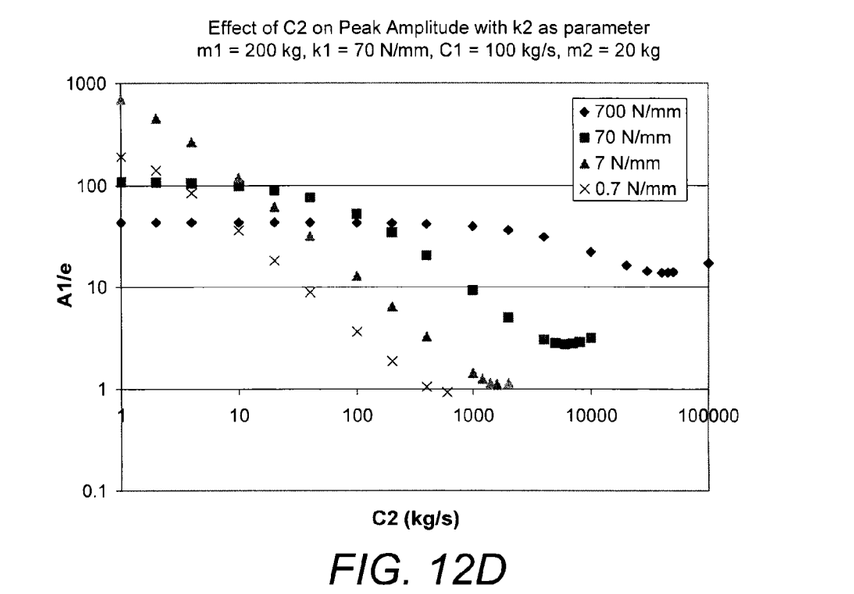

FIGS. 12B-12D are plots of damping on for a dual mass damped harmonic oscillators. FIG. 12B is a plot of A1/e versus frequency for the series connected dual damped oscillators for various damping coefficients c2 (from 0 to $10^6$ kg/s) to ground of the second mass, m2 of 20 kg. The first mass, m1 is 20 kg and the coupling between the masses has a spring rate, k1, of 70 N/mm and a damping coefficient of 100 kg/s. The spring rate, k2 of the second mass coupled to ground is also 70 N/mm. FIG. 12C is a plot of a similar study for a range of c2 from 100 to $10^5$ kg/s the same configuration of dual masses except that k2 is increased to 700 N/mm. Finally, FIG. 12D are different plots of A1/e versus c2 for different values of k2 ranging from 0.7 to 700 N/mm. In a similar manner, with appropriate values of the parameters, these analytical models can be used to describe a superconducting levitation system, such as used in a flywheel, to optimize lateral damping to the stator and improve damping affecting the rotor.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. An apparatus for damping a superconducting levitation system, comprising:
    a superconducting element generating a magnetic field having a first resonance frequency between the superconducting element and a ground state; and
    a magnet supported by the magnetic field generated by the superconducting element relative to a ground state having a second resonance frequency between the magnet and the superconducting element;
    wherein the superconducting element is supported relative to the ground state with damped motion substantially perpendicular to the support of the magnetic field on the magnet such that the first resonance frequency is lower than the second resonance frequency.

2. The apparatus of claim 1, wherein the superconducting element comprises a superconducting stator, the magnet comprises a permanent magnet rotor, and the damped motion of the superconducting stator is substantially radial to the permanent magnet rotor.

3. The apparatus of claim 1, wherein the superconducting element comprises an array of high-temperature superconductors.

4. The apparatus of claim 1, wherein damping of the damped motion is provided by one or more dashpots coupled between the ground state and the superconducting element.

5. The apparatus of claim 1, further comprising a cryostat thermally coupled to the superconducting element to maintain superconductivity of the superconducting element.

6. The apparatus of claim 5, wherein the cryostat comprises a cold head using a gaseous helium working fluid thermally coupled to the superconducting element and external to the damped motion of the superconducting element.

7. The apparatus of claim 5, wherein the cryostat comprises a liquid nitrogen bath.

8. The apparatus of claim 7, wherein damping of the damped motion is provided by the superconducting element moving through the liquid nitrogen bath.

9. The apparatus of claim 7, wherein the liquid nitrogen bath is circulated through an outlet and an inlet to and from an external liquid nitrogen system.

10. The apparatus of claim 9, wherein the outlet and the inlet comprise bellows couplings to allow the damped motion between the superconducting element and the ground state.

11. A method for damping a superconducting levitation system, comprising the steps of:
    generating a magnetic field with a superconducting element having a first resonance frequency between the superconducting element and a ground state;
    supporting a magnet with the magnetic field generated by the superconducting element relative to a ground state having a second resonance frequency between the magnet and the superconducting element; and
    damping motion of the superconducting element substantially perpendicular to support of the magnetic field on the magnet relative to the ground state such that the first resonance frequency is lower than the second resonance frequency.

12. The method of claim 11, wherein the superconducting element comprises a superconducting stator, the magnet comprises a permanent magnet rotor, and the damped motion of the superconducting stator is substantially radial to the permanent magnet rotor.

13. The method of claim 11, wherein the superconducting element comprises an array of high-temperature superconductors.

14. The method of claim 11, wherein damping of the damped motion is provided by one or more dashpots coupled between the ground state and the superconducting element.

15. The method of claim 11, further comprising a cryostat thermally coupled to the superconducting element to maintain superconductivity of the superconducting element.

16. The method of claim 15, wherein the cryostat comprises a cold head using a gaseous helium working fluid thermally coupled to the superconducting element and external to the damped motion of the superconducting element.

17. The method of claim 15, wherein the cryostat comprises a liquid nitrogen bath.

18. The method of claim 17, wherein damping of the damped motion is provided by the superconducting element moving through the liquid nitrogen bath.

19. The method of claim 17, wherein the liquid nitrogen bath is circulated through an outlet and an inlet to and from an external liquid nitrogen system.

20. The method of claim 19, wherein the outlet and the inlet comprise bellows couplings to allow the damped motion between the superconducting element and the ground state.

21. An apparatus for damping a superconducting levitation system, comprising:

a superconducting means for generating a magnetic field having a first resonance frequency between the superconducting means and a ground state;

a magnetic means for levitating under influence of the magnetic field generated by the superconducting means relative to a ground state having a second resonance frequency between the magnetic means and the superconducting means; and a damping means for damping motion of the superconducting means substantially perpendicular to support of the magnetic field on the magnetic means relative to the ground state such that the first resonance frequency is lower than the second resonance frequency.

22. The apparatus of claim 21, further comprising a cryostat means for cooling the superconducting means to maintain superconductivity of the superconducting means.

* * * * *